(12) United States Patent
Vasseur et al.

(10) Patent No.: US 8,817,591 B2
(45) Date of Patent: Aug. 26, 2014

(54) INTER-DOMAIN SIGNALING TO UPDATE REMOTE PATH COMPUTATION ELEMENTS AFTER A CALL SET-UP FAILURE

(75) Inventors: Jean-Philippe Vasseur, Saint Martin d'Uriage (FR); Stefano Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 13/524,168

(22) Filed: Jun. 15, 2012

(65) Prior Publication Data

US 2013/0336103 A1 Dec. 19, 2013

(51) Int. Cl.
*H04L 1/00* (2006.01)
*H04L 12/26* (2006.01)

(52) U.S. Cl.
USPC .......................................... 370/216; 370/243

(58) Field of Classification Search
None
See application file for complete search history.

(56) References Cited

U.S. PATENT DOCUMENTS

| | | | |
|---|---|---|---|
| 7,031,262 B2 | 4/2006 | Vasseur et al. | |
| 7,586,841 B2 | 9/2009 | Vasseur | |
| 7,668,971 B2 | 2/2010 | Vasseur et al. | |
| 7,675,860 B2 | 3/2010 | Vasseur et al. | |
| 7,886,079 B2 | 2/2011 | Vasseur et al. | |
| 8,072,879 B2 | 12/2011 | Vasseur et al. | |
| 2005/0265255 A1* | 12/2005 | Kodialam et al. | 370/252 |
| 2006/0098587 A1* | 5/2006 | Vasseur et al. | 370/254 |
| 2006/0159009 A1* | 7/2006 | Kim et al. | 370/216 |
| 2007/0058568 A1* | 3/2007 | Previdi et al. | 370/254 |
| 2008/0151746 A1* | 6/2008 | Vasseur et al. | 370/228 |
| 2009/0182894 A1 | 7/2009 | Vasseur et al. | |
| 2011/0211445 A1* | 9/2011 | Chen | 370/221 |
| 2012/0195229 A1* | 8/2012 | Chen | 370/254 |
| 2012/0213224 A1* | 8/2012 | Chen | 370/390 |

FOREIGN PATENT DOCUMENTS

EP 2549703 A1 1/2013

OTHER PUBLICATIONS

Ayyangar, et al., "Inter Domain GMPLS Traffic Engineering—RSVP-TE Extensions", IETF Internet Draft, draft-ietf-ccamp-inter-domain-rsvp-te-03.txt, Mar. 2006, 24 Pages, The Internet Society.
Cipolla, et al., "Notification of Transmittal of the International Search Report and the Written Opinion of the International Searching Authority, or the Declaration", Patent Cooperation Treaty, International Application No. PCT/US2013/045952, mailed Oct. 18, 2013, 14 pages, European Patent Office, Rijswijk, Netherlands.

(Continued)

*Primary Examiner* — Eunsook Choi
(74) *Attorney, Agent, or Firm* — Edwards Wildman Palmer LLP; James M. Behmke; Stephen D. LeBarron

(57) ABSTRACT

In one embodiment, a router in a non-originating domain receives a signal to establish a tunnel, the signal having an identification (ID) of an originating path computation element (PCE) of an originating domain from where the signal to establish the tunnel originated. In response to determining that establishment of the tunnel fails, the router may signal the failure of the establishment to a local PCE of the non-originating domain, the signaling indicating the ID of the originating PCE to cause the local PCE to provide updated routing information of the non-originating domain to the originating PCE.

20 Claims, 12 Drawing Sheets

(56) References Cited

OTHER PUBLICATIONS

Dasgupta, et al., Path-Computation-Element-Based Architecture for Interdomain MPLS/GMPLS Traffic Engineering: Overview and Performance, IEEE Network, vol. 21, No. 4, Jul./Aug. 2007, pp. 38-45, IEEE Service Center.

Pontes, et al., "PCE-Based Inter-Domain Lightpath Provisioning", International Conference on Communications, Jun. 2012, pp. 3073-3078, IEEE.

Velasco, et al., "GMPLS-Based Multidomain Restoration: Analysis, Strategies, Policies and Experimental Assessment", Journal of Optical Communications and Networking, vol. 2, No. 7, Jul. 2010, pp. 427-441, IEEE/OSA.

Crabbe, et al., "PCEP Extensions for Stateful PCE", IETF Trust, Network Working Group, Internet Draft, draft-ietf-pce-stateful-pce-00, Feb. 2012, 52 pages.

Farrel, et al., "A Path Computation Element (PCE)-Based Architecture", The Internet Society, Network Working Group, Request for Comments 4655, Aug. 2006, 41 pages.

Gredler, et al., "North-Bound Distribution of Link-State and TE Information Using BGP", IETF Trust, Internet Draft, draft-gredler-idr-ls-distribution-01, Mar. 2012, 31 pages.

Pan, et al., "Fast Reroute Extensions to RSVP-TE for LSP Tunnels", The Internet Society, Network Working Group, Request for Comments 4090, May 2005, 39 pages.

Vasseur, et al., "Path Computation Element (PCE) Communication Protocol (PCEP)", IETF Trust, Network Working Group, Request for Comments 5440, Mar. 2009, 87 pages.

\* cited by examiner

INTER-DOMAIN SIGNALING TO UPDATE REMOTE PATH COMPUTATION ELEMENTS AFTER A CALL SET-UP FAILURE

TECHNICAL FIELD

The present disclosure relates generally to computer networks, and, more particularly, to path computation elements (PCEs).

BACKGROUND

Tunnels have been used for a number of applications such as the support of virtual private networks (VPNs) or Traffic Engineering following source routed paths hop-by-hop. Among the number of tunneling techniques developed over the past decade, multiprotocol label switching (MPLS) Traffic Engineering (TE) has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure.

Path computation elements (PCEs), as defined, for example, in the Internet Engineering Task Force's Request for Comment (RFC) 4655, generally consist of relying on an external engine (PCE) responsible for the computation of tunnels in the network. Head-ends (or Path Computation Clients—PCCs) send requests to PCEs (PCReq messages) using the PCEP signaling protocol (RFC 5440), and receive computed paths thanks to replies (PCRep messages). PCEP also specifies notification and error messages. PCEs have been used mostly for back-up tunnel path computation and inter-domain (Inter-area/AS) path computations where per-domain path computation was the only (potentially very sub-optimal) technique available prior to the PCE.

PCE-based networks deployed so far have been stateless. That is, tunnels were computed by the PCE according to the Traffic Engineering Database (TED) fed in most cases by the routing protocol without requiring any state maintenance. However, for certain applications, stateful PCE may provide a more optimal solution. A new stateful PCE draft has been adopted as an IETF Working Document, entitled "PCEP Extensions for Stateful PCE"<draft-ietf-pce-stateful-pce> by Crabbe et al., and which specifies several new PCEP messages, allowing PCCs to update the PCE on their tunnel states (PCRpt messages), control tunnel delegation (ability for the PCE to remotely control a tunnel) and for the PCE to send tunnel requests to PCCs to learn states (PCUpd messages). Stateful PCE architectures, however, still present a number of challenges of various natures.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
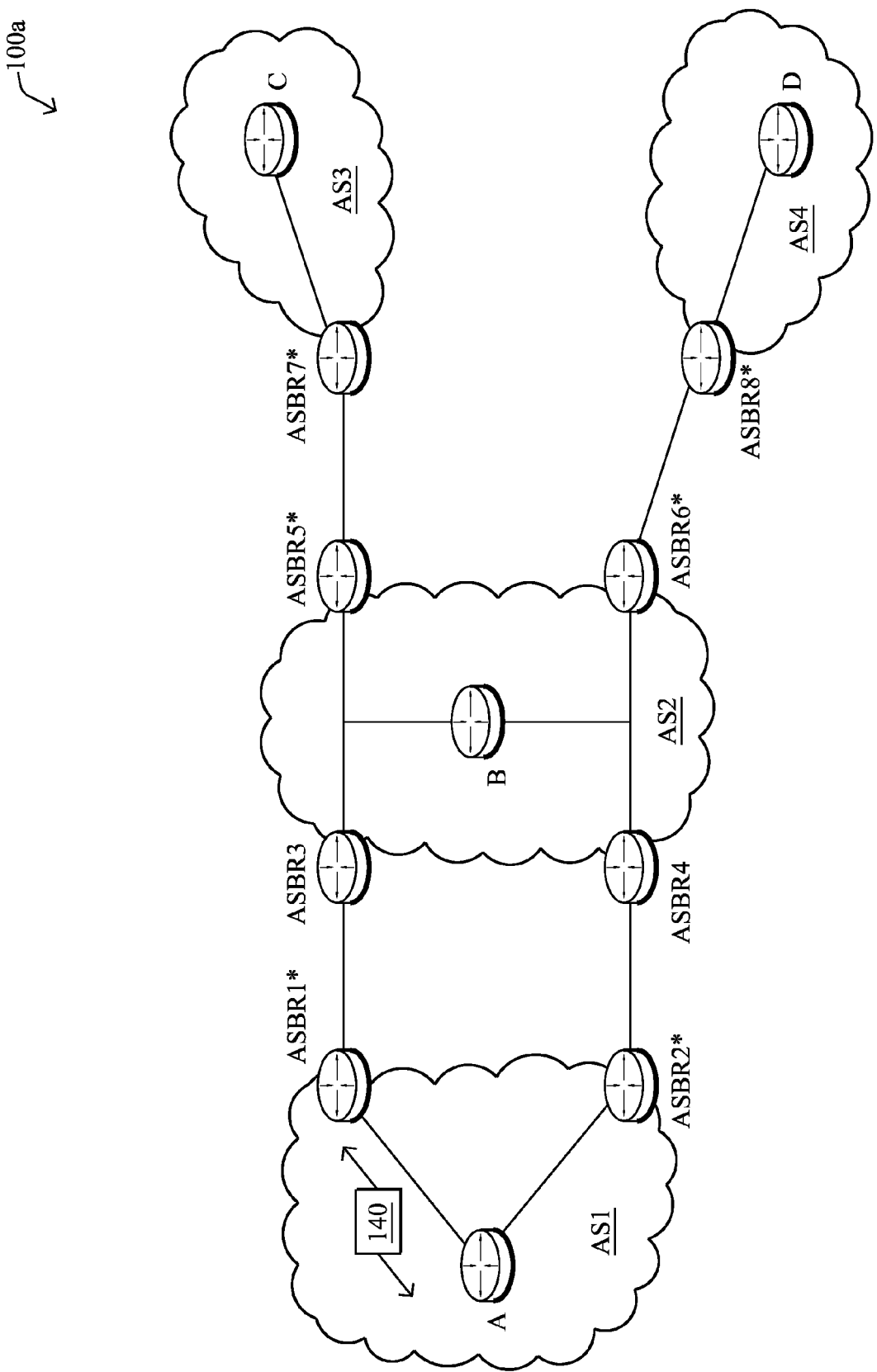
FIGS. 1A-1B illustrate example computer networks.

According to one or more embodiments of the disclosure, a router in a non-originating domain receives a signal to establish a tunnel, the signal having an identification (ID) of an originating path computation element (PCE) of an originating domain from where the signal to establish the tunnel originated. In response to determining that establishment of the tunnel fails, the router may signal the failure of the establishment to a local PCE of the non-originating domain, the signaling indicating the ID of the originating PCE to cause the local PCE to provide updated routing information of the non-originating domain to the originating PCE.

In accordance with one or more additional embodiments of the disclosure, the local PCE receives the failure signal and extracts the ID of an originating PCE. Once updated routing information of the non-originating domain is determined, then the local PCE may provide the updated routing information of the non-originating domain from the local PCE to the originating PCE in response to the failure signal.

In accordance with one or more additional embodiments of the disclosure, a head-end node of an originating domain requests, from the originating PCE of the originating domain, a path for a tunnel through one or more non-originating domains, and signals establishment of the tunnel, where the signaling carries an ID of the originating PCE. In response to receiving a failure signal indicating failure of the establishment of the tunnel from router of a particular non-originating domain, the head-end node may wait a configured time for the originating PCE to receive a routing update from the particular non-originating domain, and then may request an updated path for the tunnel from the originating PCE.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a router used to interconnect multiple domains is generally referred to as a "border router" or BR. In the case of areas rather than ASes since the routers are under a common authority, a single router may in fact serve as an exit border router of one area and an entry border router of another area.

FIG. 1A is a schematic block diagram of an exemplary computer network 100a comprising autonomous system AS2, which is interconnected with a plurality of other autonomous systems AS1, AS3, and AS4. An Autonomous System (AS) is herein defined to be a group of intermediate nodes, such as intradomain routers, within a network that are subject to a common authority and execute one or more intradomain routing protocols. Although, each AS is illustratively an autonomous system, those skilled in the art will appreciate that the ASes may alternatively be configured as routing domains or other networks or subnetworks. The autonomous system AS1 includes intradomain routers such as border routers ASBR1* and ASBR2* through which communication, such as data packets, may pass into and out of the autonomous system to border routers ASBR3 and ASBR4, respectively of AS2. AS2 also includes border routers ASBR5* and ASBR6* in communication with border routers ASBR7* and ASBR8* of ASes 3 and 4, respectively. Moreover, within AS1, AS2, AS3, and AS4, there are exemplary intradomain routers A, B, C, and D, respectively.

Figure 1B:
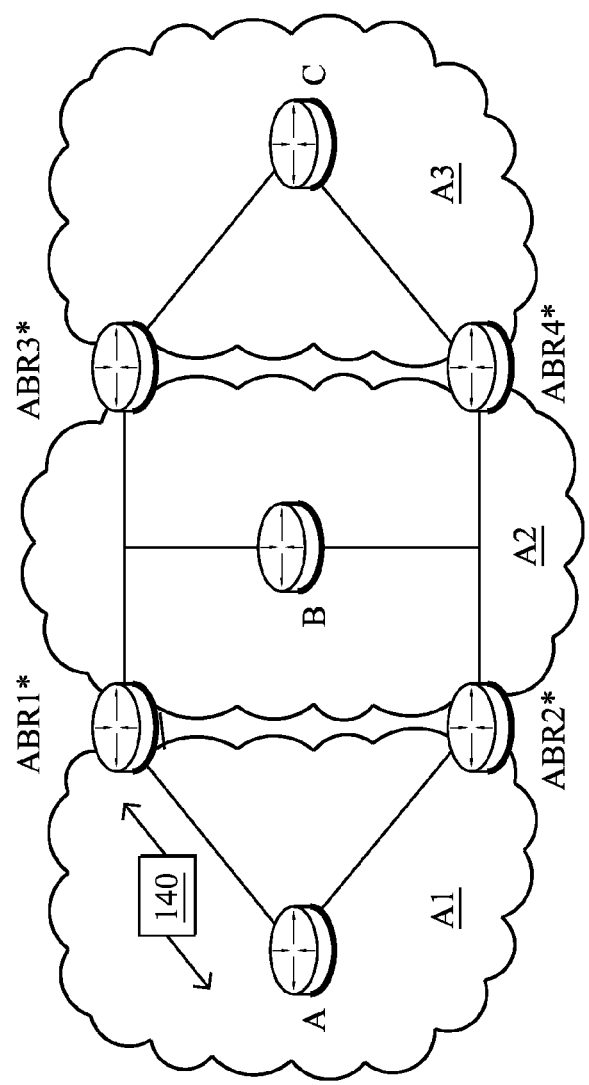

Alternatively or in addition, FIG. 1B is a schematic block diagram of an exemplary computer network 100b comprising areas A1, A2, and A3, each having at least one intradomain router, A, B, and C, respectively. In particular, A1 and A2 share border routers ABR1* and ABR2*, while A2 and A3 share ABR3* and ABR4. As used herein, an area is a collection of routers that share full network topology information with each other but not necessarily with routers outside the area. The term area as used herein also encompasses the term "level" which has a similar meaning for networks based on their chosen routing protocol.

Data packets 140 (e.g., discrete frames or packets of data) may be exchanged among the nodes/devices of the computer network 100 (100a and 100b, generically) using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In this context, a protocol consists of a set of rules defining how the nodes interact with each other. For example, in addition to user data, routing information may be distributed among the routers within an AS (e.g., between areas A1-A3) using pre-determined "interior" gateway protocols (IGPs), such as conventional distance-vector protocols or, illustratively, link-state protocols, through the use of link-state advertisements (LSAs) or link-state packets. Moreover, data packets containing network routing information may be exchanged among the autonomous systems AS1-AS4 using "external" gateway protocols, such as the Border Gateway Protocol (BGP).

Those skilled in the art will understand that any number of nodes, devices, links, etc. may be used in the computer network, and that the view shown herein is for simplicity. Furthermore, the techniques described below with reference to inter-AS path computation may be used in the context of inter-area path computation and, under certain conditions, the techniques described with reference to inter-area path computation may be used for inter-AS path computation.

Figure 2:
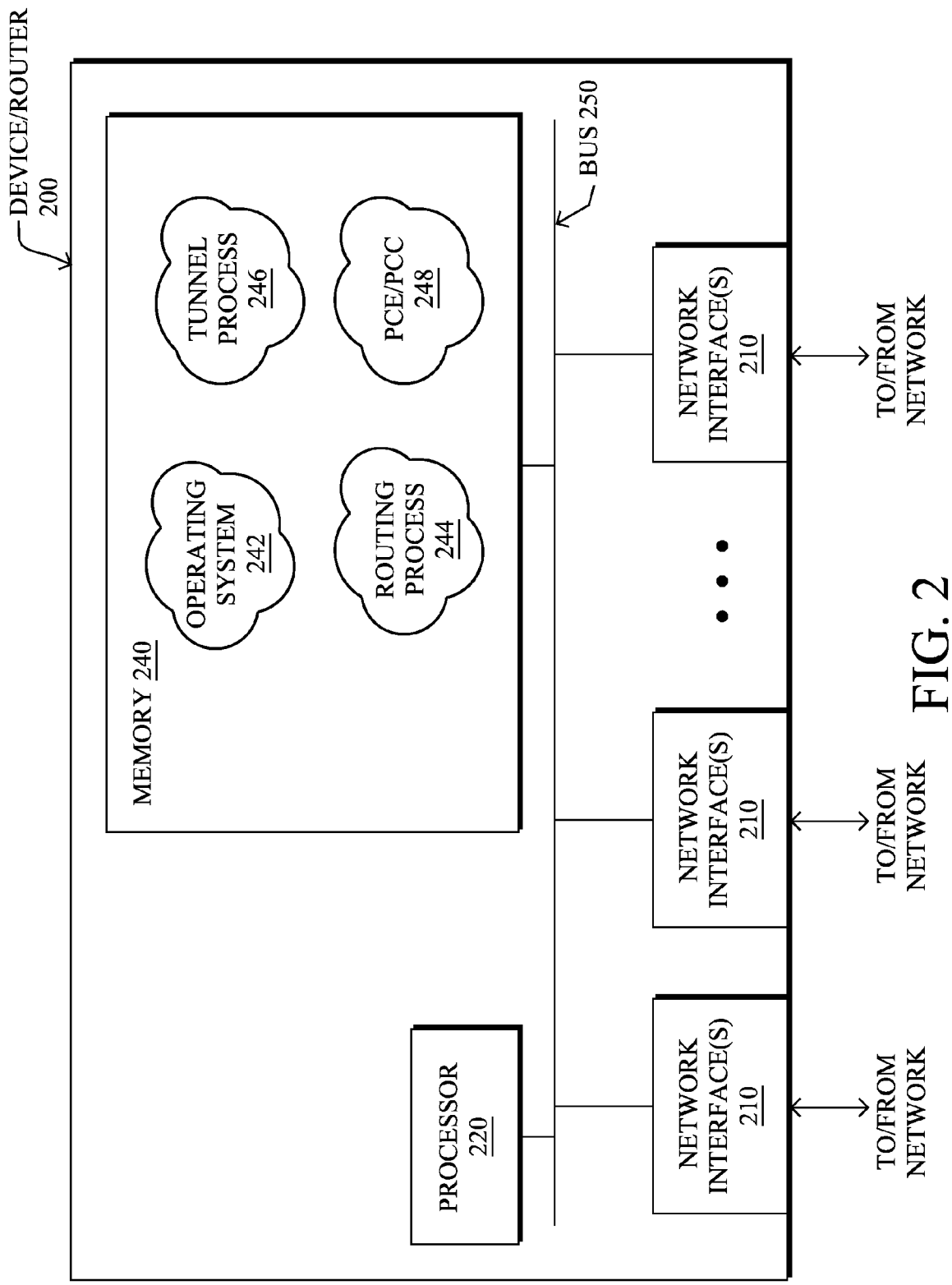
FIG. 2 illustrates an example network device/node.

FIG. 2 is a schematic block diagram of an example node/device (e.g., router) 200 that may be used with one or more embodiments described herein, e.g., as any of the devices in FIGS. 1A and 1B above, particularly as a path computation element or client (PCE or PCC) described herein. The device may comprise one or more network interfaces 210, at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as routing databases/link state databases (LSDBs)/Traffic Engineering databases (TEDs) and or tables. An operating system 242, portions of which are typically resident in memory 240 and executed by the processor, functionally organizes the device by, among other things, invoking operations in support of software processes and/or services executing on the device. These software processes and/or services may comprise routing process/services 244, tunneling process/services 246, and an illustrative PCE/PCC process 248, as described herein. Note that while the processes are shown in centralized memory 240, alternative embodiments provide for certain aspects of the techniques herein to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as the Interior Gateway Protocol (IGP) (e.g., Open Shortest Path First, "OSPF," and Intermediate-System-to-Intermediate- System, "IS-IS") as IGP services, the Border Gateway Protocol (BGP), etc., as will be understood by those skilled in the art. These functions may be configured to manage routing and forwarding information databases/tables (data structures 245) containing, e.g., data used to make routing and forwarding decisions. Notably, routing services 244 may also perform functions related to virtual routing protocols, such as maintaining virtual routing/forwarding (VRF) instances (illustratively a component of tables 245) as will be understood by those skilled in the art.

Changes in the network topology within the local domain (network 100) may be communicated among nodes/routers 200 within the network 100 using routing services 244, for example, IGP services such as the conventional OSPF and IS-IS link-state protocols. Suppose, for example, that a communication link fails or a cost value associated with a network node changes. Once the change in the network's state is detected by one of the routers, that router may flood an IGP (or BGP) advertisement (message/packet 140) communicating the change to the other routers in the network. In this manner, each of the routers eventually "converges" to an identical view of the network topology.

Multi-Protocol Label Switching (MPLS) is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (data structure 245) stores the FEC, the next-hop information for the LSP, and the label required by the next hop.

Also, MPLS Traffic Engineering (TE) has been developed to meet data networking requirements such as guaranteed available bandwidth or fast reroute (FRR). MPLS TE exploits modern label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, among others, the Layer Two Tunnel Protocol (L2TP), the Point-to-Point Tunneling Protocol (PPTP), IP tunnels, and generic routing encapsulation (GRE) tunnels.

In particular, establishment of a tunnel (e.g., TE-LSP) requires computation of a path between a head-end node (LSR) to a tail-end node, signaling along the path (e.g., through resource reservation protocol (RSVP)-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. In addition, a number of techniques have been developed to allow for dynamic bandwidth adjustment of the signaled bandwidth using RSVP-TE, the allocation of dynamic preemptions so as to mitigate the probability of dead-lock due to bin-packing issues or bandwidth fragmentation, distributed re-optimization techniques to defragment bandwidth in the network, distributed techniques for backup tunnel computation maximizing back-up bandwidth usage according to the assumption of single link/node/SRLG resources (bandwidth sharing between independent resources), etc.

Occasionally, a network element (e.g., a node or link) will fail, causing redirection of the traffic that originally traversed the failed network element to other network elements that bypass the failure. Generally, notice of this failure is relayed to the nodes in the network through an advertisement of the new network topology, e.g., an IGP or BGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, such as Fast Reroute, e.g., MPLS TE Fast Reroute (RFC4090).

Fast Reroute (FRR) has been widely deployed to protect against network element failures, where "backup tunnels" are created to bypass one or more protected network elements (e.g., links, shared risk link groups (SRLGs), and nodes). When the network element fails, traffic is quickly diverted ("Fast Rerouted") over a backup tunnel to bypass the failed element, or more particularly, in the case of MPLS, a set of primary TE-LSPs (tunnels) is quickly diverted. Specifically, the point of local repair (PLR) node configured to reroute the traffic inserts ("pushes") a new label for the backup tunnel, and the traffic is diverted accordingly. Once the failed element is bypassed, the backup tunnel label is removed ("popped") by the last LSR along the backup path, and the traffic is routed along the original path according to the next label (e.g., that of the original TE-LSP). Notably, the backup tunnel, in addition to bypassing the failed element along a protected primary TE-LSP, also intersects the primary TE-LSP, i.e., it begins and ends at nodes along the protected primary TE-LSP.

As noted above, tunnels have been used for a number of applications such as the support of virtual private networks (VPNs) or Traffic Engineering following source routed paths hop-by-hop. Among the number of tunneling techniques developed over the past decade, MPLS TE has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure. MPLS TE-LSPs, for example, were originally computed using distributed constrained shortest path first (CSPF) algorithms where each tunnel head-end was responsible for the computation of the LSP path in the network, using a constrained SPF (e.g., Dijsktra) according to the Traffic Engineering Database (TED) distributed by a link state routing protocol such as OSPF or IS-IS.

A series of challenging problems arose that required the use of a new path computation model known as the Path Computation Element (PCE) model, such as defined in RFC4655. The PCE model generally consists of relying on an external engine (PCE) responsible for the computation of tunnels in the network. Head-ends (or Path Computation Clients—PCCs) send requests to PCEs (PCReq messages) using the PCEP signaling protocol (RFC5440), and receive computed paths thanks to replies (PCRep messages). PCEs have been used mostly for back-up tunnel path computation and inter-domain (Inter-area/AS) path computations where per-domain path computation was the only (potentially very sub-optimal) technique available prior to the PCE.

In particular, the PCE is an entity having the capability to compute paths between any nodes of which the PCE is aware in an AS or area (domain). (PCE process/services 248 contain computer executable instructions executed by processor 220 to perform functions related to PCEs in general, and in accordance with one or more embodiments described herein.) PCEs are especially useful in that they are more cognizant of network traffic and path selection within their AS or area, and thus may be used for more optimal path computation. A head-end node/LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement") carried within a routing protocol message, which is sent from the PCE within its area or level or across the entire AS to advertise its services.

Generally, PCE functions are hosted on a BR between domains for inter-domain path computation, and there are typically at least two BRs, so there is no single point of failure. For example, ASBRs and ABRs tagged with an asterisk (*) in FIGS. 1A and 1B may be configured as PCEs. Note that while illustratively PCE functions are generally hosted on a BR, the techniques described herein are equally applicable to PCEs not hosted on a BR, accordingly.

Figure 3A:
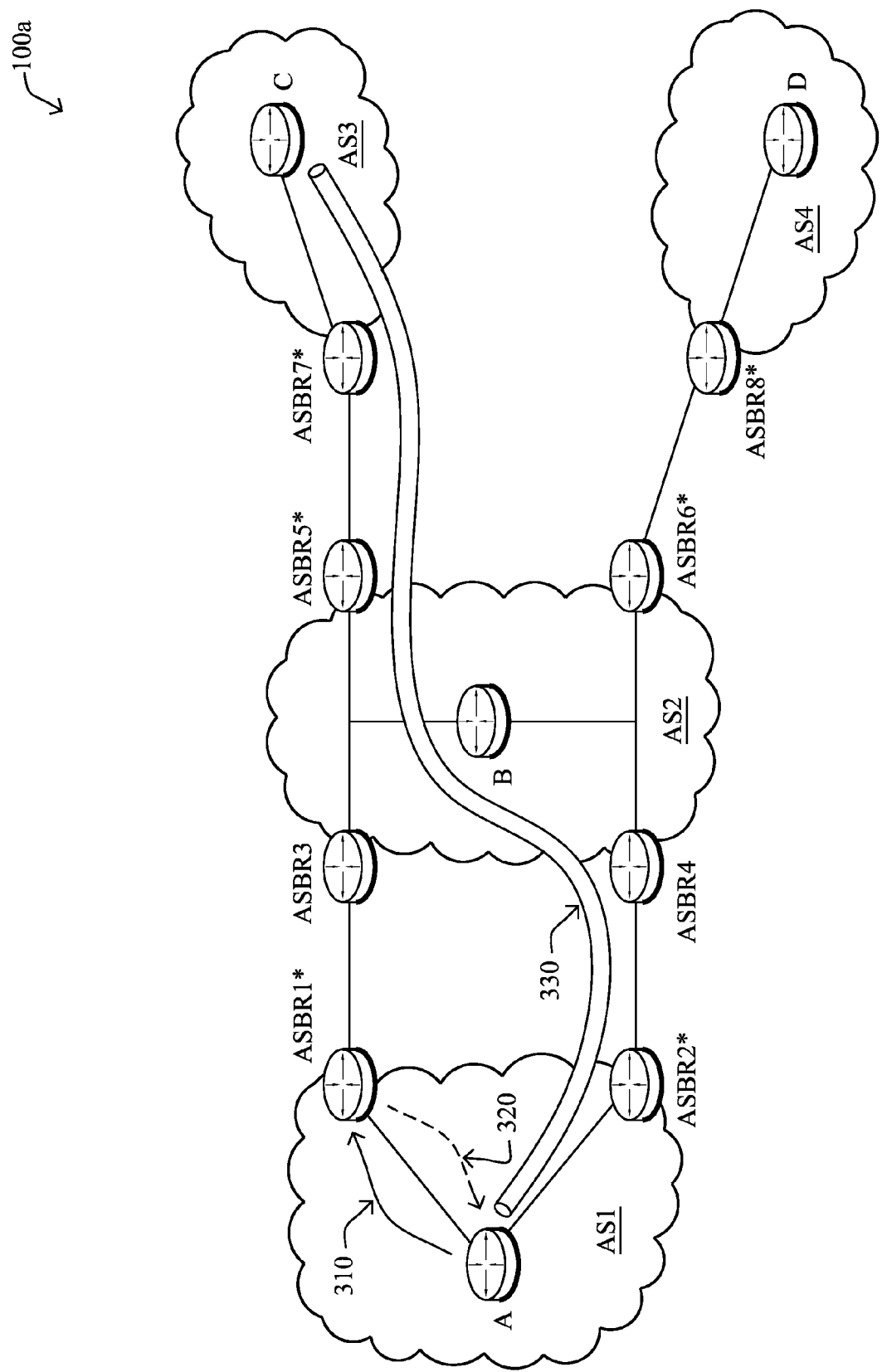
FIGS. 3A-3B illustrate examples of PCE-based tunnel computation in the networks of FIGS. 1A-1B.
Figure 3B:
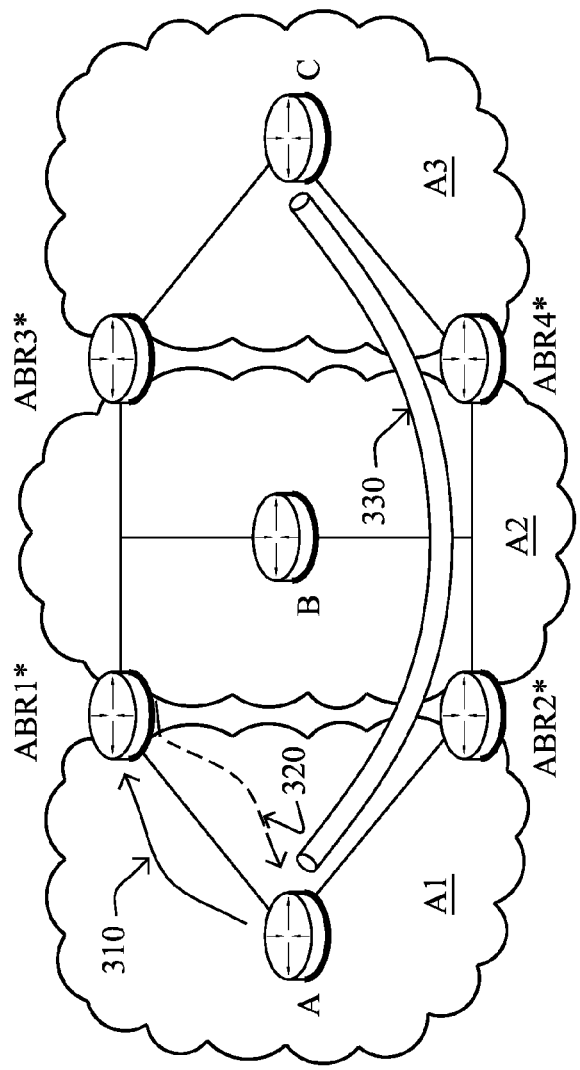

FIGS. 3A-3B illustrate simple examples of PCE-based tunnel computation in the networks 100a and 100b of FIGS. 1A-1B, respectively. In particular, assume in each instance that LSR A, acting as a PCC, requests, from a local PCE (e.g., ASBR1* or ABR1*, respectively), a tunnel to LSR C. The path computation request 310 results in computation of the path, and a path computation response 320 is returned to the head-end LSR A. The tunnel 330 may then be established, accordingly. (Note that for inter-domain computation, the local PCE may act as a PCC to other PCEs in other domains, as mentioned above.) Note further that while PCEs are particularly useful for inter-domain path computation, the techniques herein are not limited to inter-domain path computation, and may, in fact, be used for intra-domain path computation as well.

In PCE-based networks deployed so far, PCEs have been stateless: LSPs were computed by the PCE according to the Traffic Engineering Database (TED) fed in most cases by the routing protocol (ISIS or OSPF, more recently potentially using BGP) without requiring any state maintenance. Although the PCE architecture did refer to the potential use of stateful PCEs as a potentially more optimal model that would keep track of all LSPs states in the network when computing LSPs, the model was seen to be quite complex in terms of signaling, states maintenance, etc. with a number of very challenging issues.

It became apparent that stateful PCE was the solution of choice for several applications such as inter-layer optimizations or global optimization, but only recently did the number of use cases grow significantly considering increased requirements for advanced optimization of bandwidth resources. To that end, stateful PCEs have been implemented, and a stateful PCE draft standard was adopted as the IETF Working Document mentioned above entitled "PCEP Extensions for Stateful PCE", which specifies several new PCEP messages, allowing PCC to update the PCE on their LSP states (PCRpt messages), control LSP delegation (ability for the PCE to remotely control an LSP) and for the PCE to send LSP requests to PCC to learn states (PCUpd messages). As defined in the above document, a function can be initiated either from a PCC towards a PCE (C-E) or from a PCE towards a PCC (E-C). The new functions are:

Capability negotiation (E-C, C-E): Both the PCC and the PCE must announce during PCEP session establishment that they support PCEP Stateful PCE extensions defined in this document;

LSP state synchronization (C-E): After the session between the PCC and a stateful PCE is initialized, the PCE must learn the state of a PCC's LSPs before it can perform path computations or update LSP attributes in a PCC;

LSP Update Request (E-C): A PCE requests modification of attributes on a PCC's LSP;

LSP State Report (C-E): A PCC sends an LSP state report to a PCE whenever the state of an LSP changes; and LSP control delegation (C-E, E-C): A PCC grants to a PCE the right to update LSP attributes on one or more LSPs; the PCE becomes the authoritative source of the LSP's attributes as long as the delegation is in effect; the PCC may withdraw the delegation or the PCE may give up the delegation.

Stateful PCEs are slated to play a major role in future tunnel-enabled network architectures. Though the use of stateful PCEs is intended to solve a wide range of problems, they also bring a number of hard technical issues, including, but not limited to:

1) There are a number of situations where a PCE may receive a burst of signaling requests in the network, which is in contrast with the distributed nature of CSPF: when performing global reoptimizations, rerouting a large number of LSPs upon a link/node failure (in some networks, a single failure may lead to tens of thousands of LSP failures).

2) State maintenance is another critical issue. Stateful PCEs are required to maintain LSP states. When recomputing an LSP, this may first require displacing other LSPs in the network, leading to a very large number of signaling exchanges in the network.

3) Scaling of the overall architecture: attempts have been made to scale the stateful PCE architecture by distributing computation among several PCEs and allowing for inter-PCE communication when performing parallel computations of LSPs. These models have shown very limited scaling due to the number of signaling exchanges between PCEs (similar to IPCs between CPU in massive parallel computing issues).

4) PCE failure during operation of maintenance, which is not an issue when the PCE is stateless. Unfortunately, the issue is significantly more complex when the PCE fails during a maintenance operation (for example, when some LSPs have been updated and the PCE fails before reaching other head-ends and notifying them of an LSP path change that is required for the other LSPs to be routed in the network), thus leaving the network in a very unstable/unknown state.

As mentioned, one of the major challenges of stateful PCE lies in the signaling churn and state maintenance in the network, which may be a limiting factor of such an architecture. In order to limit the amount of OSPF/ISIS LSA flooding so as to update the TED (Traffic Engineering Database), Traffic Engineering keeps track of reserved bandwidth on each link using fixed configurable and non-linear thresholds. For each link, the exact amount of reserved bandwidth is recorded and when a threshold is crossed, a new LSA is flooded updating the TED on all routers. These thresholds are generally non-linear, and closer to each other as the level of booking increases (for example, on a 10M link, the first threshold is 5M, 8M, 9M, 9.7, 9.8, 9.9). The idea of closer thresholds as we get closer to 100% of the bandwidth is that there is a need achieve a greater accuracy of the bandwidth booked since the risk of call set-up failure increases.

The use of thresholds for bandwidth booking states is a requirement to preserve the scalability of the routing protocol. On the other hand, when bandwidth booking is too coarse, this unavoidably leads to a high rate of call signaling failures. While this is generally not a major issue with distributed CSPF, this quickly leads to unsolvable problems with stateful PCEs. Indeed, when an LSP is computed by the stateful PCE, the path is provided to the PCC, that signals the LSP (while bandwidth is held temporarily on the PCE as it waits for reservation confirmations by the requestor, e.g., a PCUpd message). Call set-up failures in a stateful PCE environment imply that the PCC informs the stateful PCE of a call set-up failure, a local TED update is completed by the PCE releasing the previously booked bandwidth, followed by a second computation of the LSP after waiting for the TED update by the IGP or by other means. This shows that inaccuracy of the TED quickly becomes a limiting factor of stateful PCE architectures.

In addition, the lack of accuracy of the TED can have particularly undesirable consequences on the success rate of LSP set-up, which in case of failure of the call set-up would require updating the TED on the stateful PCE. This becomes especially problematic when the computed paths (TE-LSPs) are inter-AS, where multiple stateful PCEs collaborate to exchange TE-LSP information and TED databases using a protocol such as BGP Link-State (BGP-LS), e.g., defined in the Internet Draft entitled "North-Bound Distribution of Link-State and TE Information using BGP"<draft-gredler-idr-ls-distribution> by Gredler et al.

PCE Update after Call Set-Up Failure

The techniques herein provide for inter-PCE communication with stateful PCEs in a manner that allows for efficient establishment of an inter-AS tunnel. In particular, the techniques herein define new signaling mechanisms to use when call set-up failures take place in a remote AS upon signaling an inter-AS tunnel due to inaccurate TED information (or tunnel database in that remote AS). In other words, the techniques herein address the issue of lack of accuracy that would result in very undesirable call set-up failure rates because of outdated TEDs shared between stateful PCEs to compute inter-AS tunnels. As described herein, tunnels are signaled indicating the address of the PCE owning the TED of the originating AS, and in the event of a call set-up failure in a remote AS, the rejecting node (at the point of failure) would then directly signal the failure to the PCE of the rejecting node's domain, which in turn provides an updated version of the outdated TED for that domain to the stateful PCE that computed the incorrect path that triggered the tunnel.

Specifically, according to one or more embodiments of the disclosure as described in detail below, a router in a non-originating domain receives a signal to establish a tunnel, the signal having an identification (ID) of an originating path computation element (PCE) of an originating domain from where the signal to establish the tunnel originated. In response to determining that establishment of the tunnel fails, the router may signal the failure of the establishment to a local PCE of the non-originating domain, the signaling indicating the ID of the originating PCE to cause the local PCE to provide updated routing information of the non-originating domain to the originating PCE. In this manner, once a head-end node of the failed tunnel requests a new path for the tunnel, the originating PCE will have an updated (and more accurate) view of the non-originating domain.

Illustratively, the techniques described herein may be performed by hardware, software, and/or firmware, such as in accordance with the PCE/PCC process 248, which may contain computer executable instructions executed by the processor 220 to perform PCE/PCC functions relating to the techniques described herein (depending upon whether the acting device is a PCE or a PCC), e.g., in conjunction with routing process 244. For example, the techniques herein may be treated as extensions to conventional protocols, such as various PCE/PCC protocols (e.g., stateful PCE/PCC protocols), and as such, may be processed by similar components understood in the art that execute those protocols, accordingly. Notably, in this instance, a non-PCE/PCC device, e.g., an LSR, may also be configured to operate according to an illustrative PCE/PCC process 248, e.g., to perform the notification of a failure to a local PCE as described herein.

Operationally, according to the techniques herein, a set of stateful PCEs may collaborate for the computation of inter-domain (inter-AS or inter-area) tunnels, and exchange their respective TEDs through BGP-link-state (BGP-LS) updates. Once a PCE X (e.g., ASBR1*) receives the TED of a PCE Y for an domain Y (e.g., ASBR6* of AS2), PCE X can compute an inter-domain tunnel that transits the two domains, should they be connected. As such, as noted above with reference to FIGS. 3A-3B, a head-end node of an originating domain (e.g., A) may request from an originating PCE (e.g., ASBR1*) of the originating domain, a path for a tunnel through one or more non-originating domains (e.g., to C). For instance, once the head-end wants to compute an inter-domain tunnel using a set of stateful PCEs, it may first send a PCEP PCReq message to its local stateful PCE that can in turn compute the inter-domain path using its own TED and the TED of the remote domain(s) it has previously received. Note that the path may involve more than two domains. Note also that according to the embodiments herein, there is generally no a priori "bandwidth locking" mechanism, meaning that the inter-domain tunnel is computed by the originating PCE located in the head-end domain based on its local and remote TED.

Figure 4:
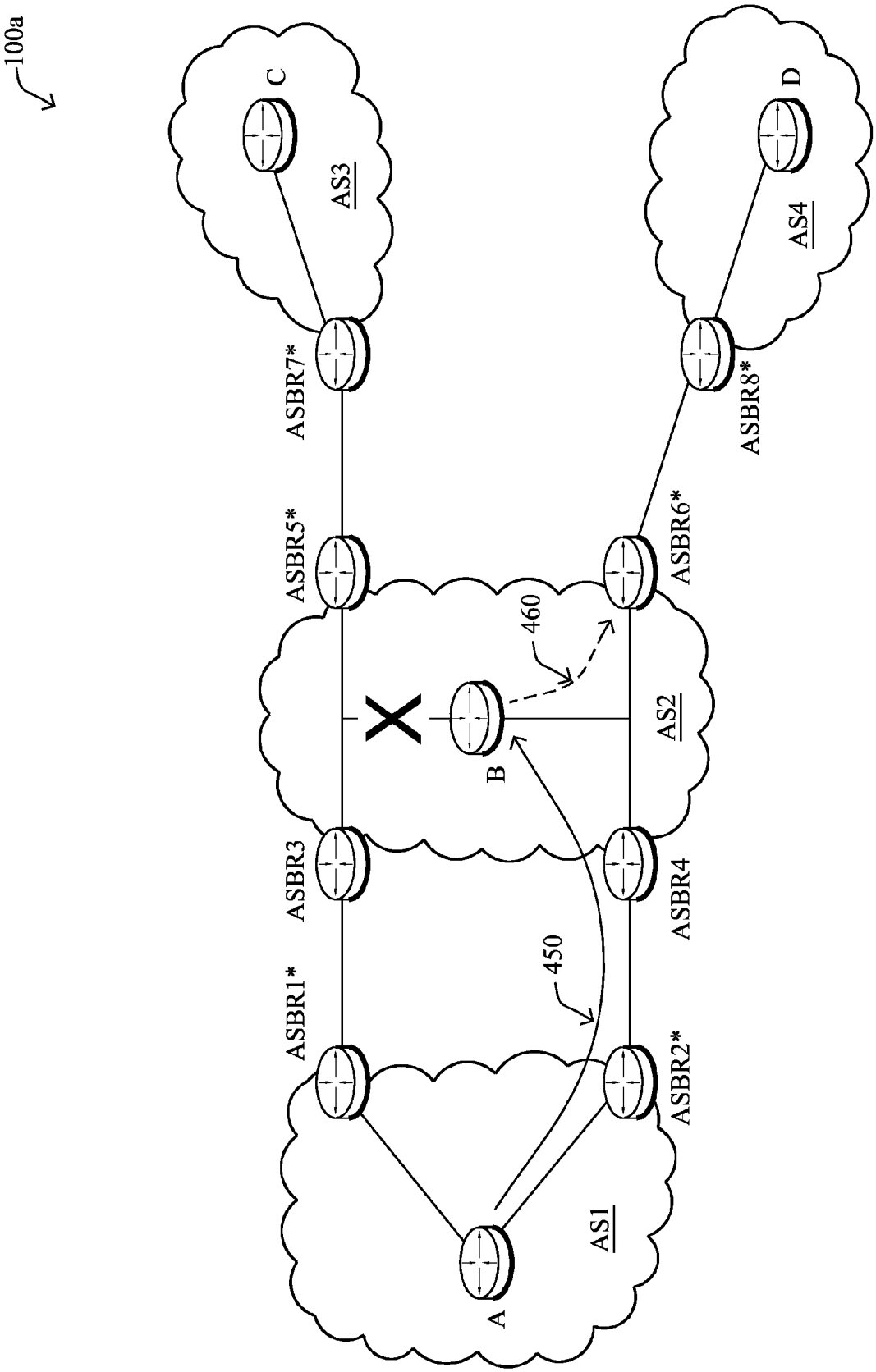
FIG. 4 illustrates an example call/tunnel set-up failure.

The computed path is sent (e.g., through PCEP) to the requesting head-end using a PCRep message, and as shown in FIG. 4, the head-end may then start the signaling of the computed inter-domain tunnel. Notably, in accordance with the techniques herein, while signaling establishment of the tunnel, the signals 450 carry an identification (ID) of the originating PCE, which may identify one or both of an address of the originating PCE, or a domain ID of the originating domain. For example, the head-end may add to the RSVP Path message a new RSVP-TE object (which could also be a newly defined TLV carried in the RRO Object of the Path Message), reporting the PCE address or domain ID (e.g., AS number) of the head-end node.

Intermediate routers along the computed path of the tunnel would then receive the signal to establish the tunnel, and eventually routers in a non-originating domain would also receive the signal. Upon determining that establishment of the tunnel fails at a particular router in a non-originating domain (e.g., at B) such as due to a lack of resources, then the techniques herein reject the signaling request for the inter-domain AS tunnel, and an assumption is made that the TED at the originating PCE does not accurately reflect the level of available resources in the remote (non-originating) domain.

The rejecting router (e.g., LSR) inspects the content of the Path message (signal 450), extracts the head-end address and determines the originating PCE ID. Notably, in certain embodiments, the PCE ID may be determined by inspecting a local BGP table of the rejecting router so as to discover the domain of the head-end, and thus correlate that domain as the PCE ID (domain ID). The rejecting router sends this information to its local PCE (e.g., signal 460 to ASBR6*), and includes the information that it has extracted (e.g., through a new PCEP message: "PCRpt message"). The message illustratively reports the failure, the head-end, the PCE ID (e.g., domain of the head-end, the PCE address, etc.).

Figure 5A:
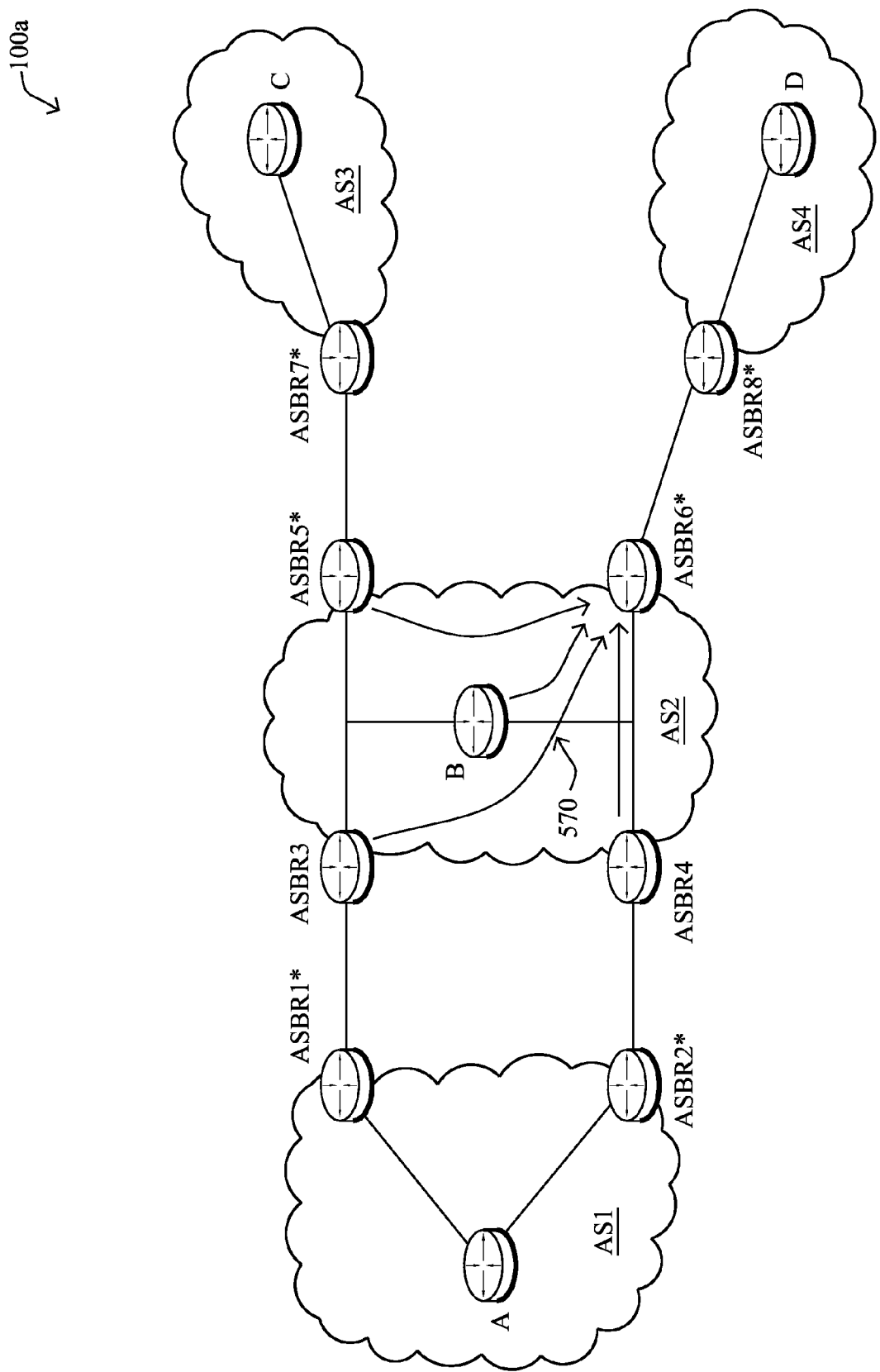
FIGS. 5A-5B illustrate examples of updated routing information.
Figure 5B:
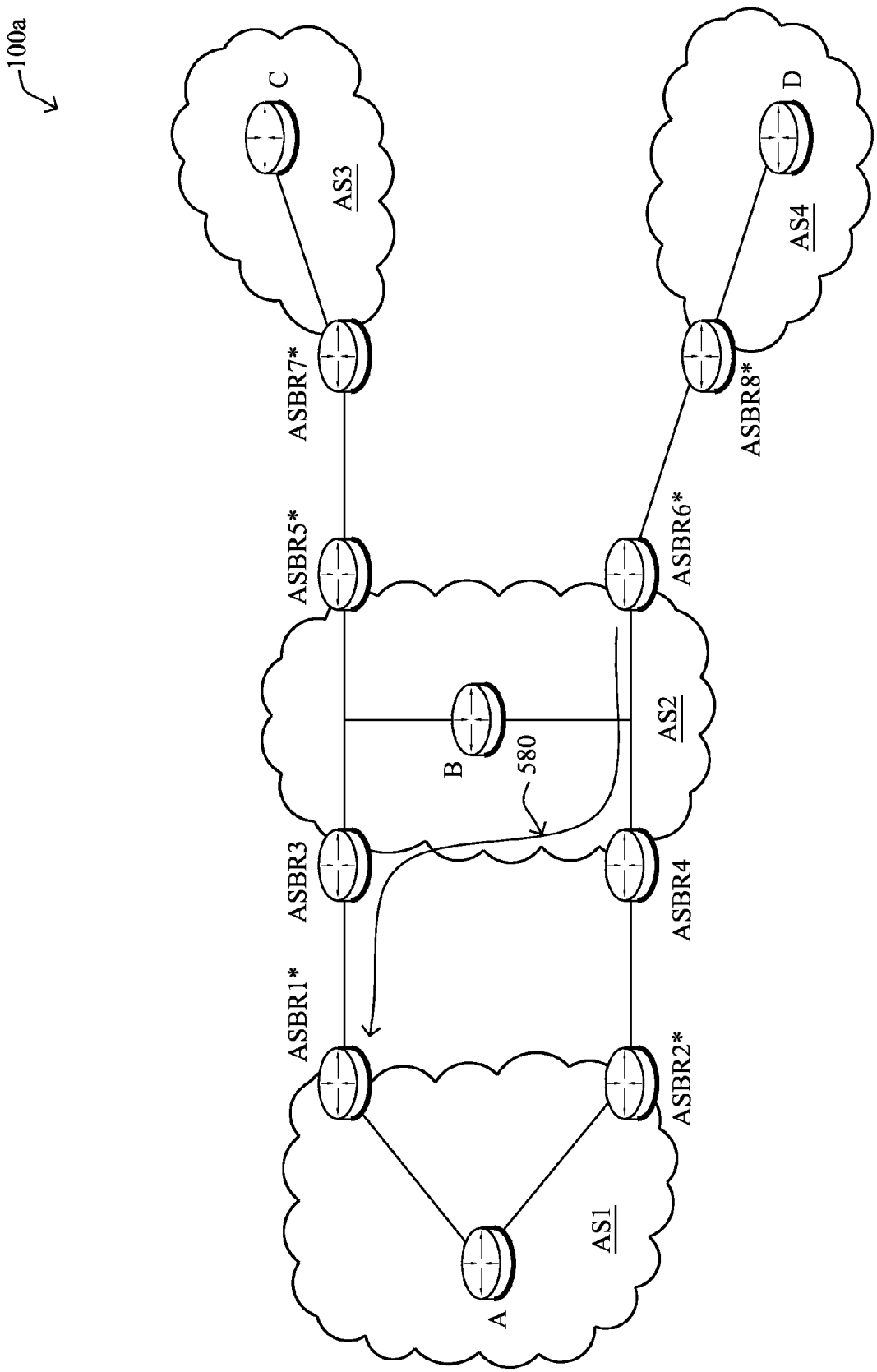

The message is then received by the stateful PCE in the rejecting router's domain (a particular non-originating domain), and from this failure signal 460, the local PCE extracts the ID of the originating PCE (PCE address, domain ID, etc.), and determines updated routing information of its local (non-originating) domain. For example, as shown in FIG. 5A, the failure signal causes the local PCE (e.g., ASBR6*) to wait for a local routing update (e.g., advertisements 570) of the non-originating domain prior to providing updated routing information to the originating PCE, as shown in FIG. 5B (update message 580). Notably, the updated routing information (and associated wait) may be based on an explicit request flooded into the local domain, or may be based on a configured (or determined) delay associated with receiving unsolicited routing updates (e.g., IGP) from within the local domain. Said differently, upon receiving the failure signal 460 (e.g., a PCEP PCRpt message), the local PCE initiates a TED update message 580 to the originating PCE (e.g., a new advertisement of BGP-LS). In one embodiment, the local PCE sends the update message after the expiration of a short timer (timer_1) in order to first update the local domain's TED, for example, to give a chance to the rejecting router (e.g., B) to trigger an IGP update or to give the local domain a chance to reply to an explicit request, etc.

Figure 6:
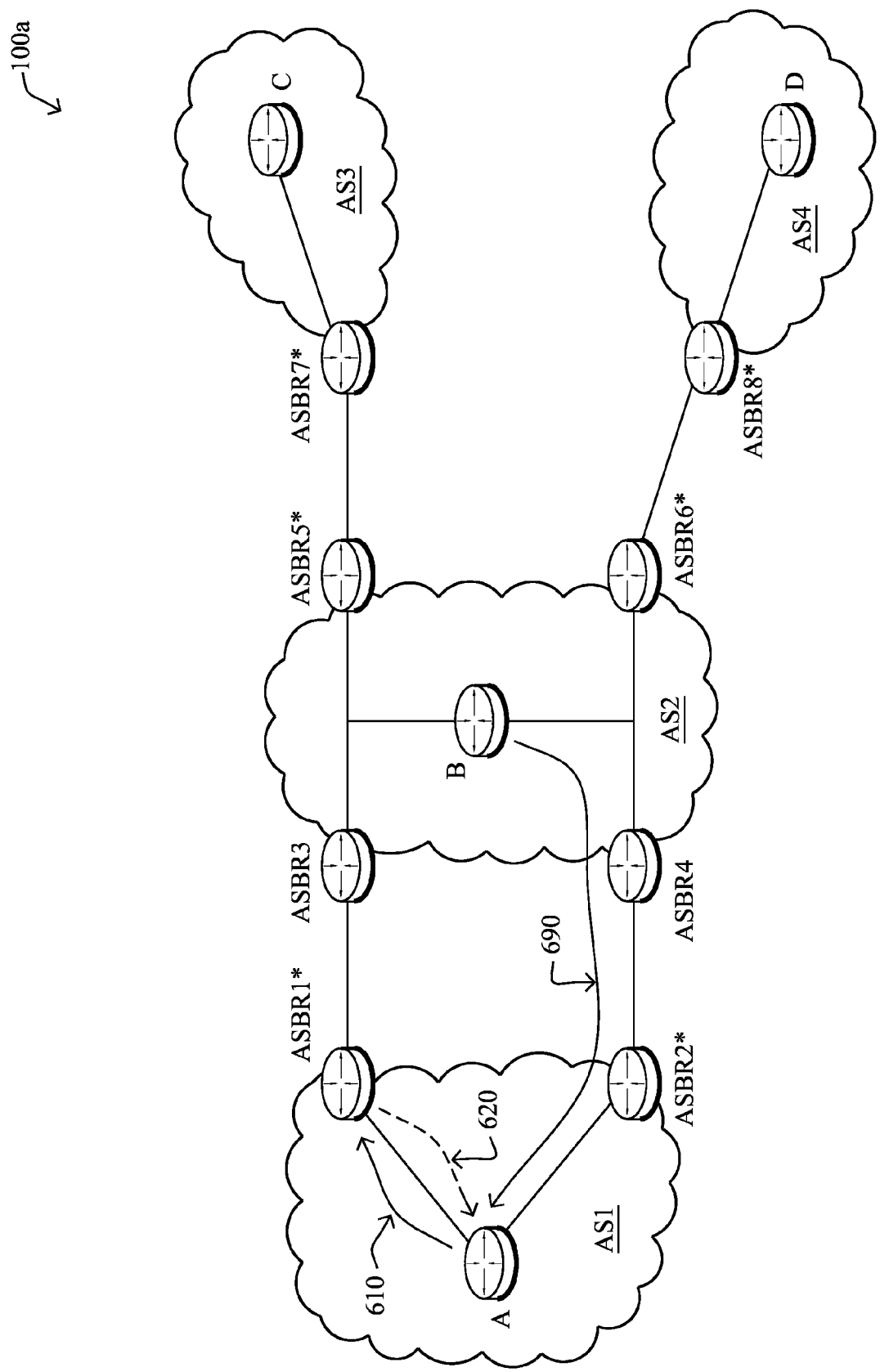
FIG. 6 illustrates an example of head-end notification.

According to conventional operation, the rejecting router would also send a Path Error message to the head-end, such as shown in FIG. 6 (message 680). The head-end node (e.g., A) would in turn send a new path computation request to its local PCE. According to the techniques herein, however, in response to the failure signal 680, the head-end node may first wait a configured time for the originating PCE to receive a routing update from the domain in which the original tunnel request failed. That is, the head-end node requests an updated path for the tunnel from the originating PCE upon expiration of the configured time (exchange 610-620, similar to 310-320 in FIGS. 3A-3B). For example, node A may arm a timer (timer_2) upon the reception of the Path Error message 680 from the intermediate router rejecting the tunnel signaling (e.g., B) before re-issuing a new Path computation request to the originating PCE (e.g., ASBR1*) so as to give a chance for the originating PCE to obtain the updated routing information (e.g., a BGP-LS message) from the PCE of the rejecting domain.

Notably, in accordance with one or more specific embodiments herein, the timers timer_1 and timer_2 may be dynamically computed, particularly with a focus on timer_2. Indeed, timer_2 should be long enough to allow sufficient time between stateful PCEs to update TEDs, yet short enough to not delay the re-signaling of the inter-domain tunnel after a failure. The mechanism specified herein thus consists of remembering the number of failures per pairs of neighboring PCEs. For instance, an increase of the number of call set-up failures for tunnels between a PCE-x and a PCE-y illustratively lead to an increase in the value of timer_2, which is provided upon each BGP-LS update when changing until reaching a stable state. Also, the observation of the failures may illustratively trigger a faster update cycle of the BGP-LS component. As an example, the algorithm used for the calculation of the timer may be based on an algorithm using dichotomy or a stepped approach, as may be appreciated by those skilled in the art.

Figure 7:
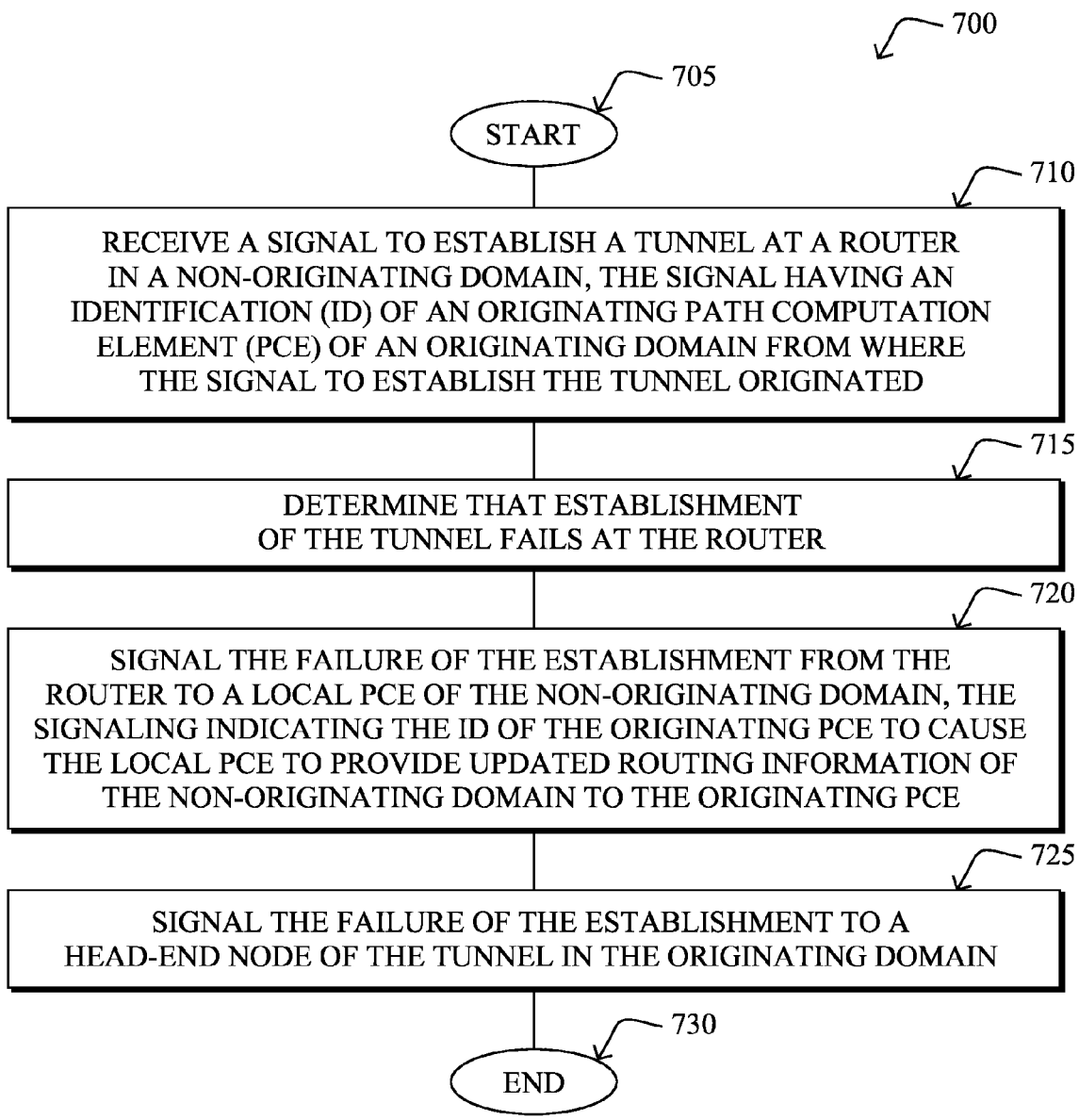
FIG. 7 illustrates an example simplified procedure for inter-domain signaling to update remote PCEs after a call set-up failure, particularly from the perspective of a router at which the tunnel fails.

FIG. 7 illustrates an example simplified procedure 700 for inter-domain signaling to update remote PCEs after a call set-up failure in accordance with one or more embodiments described herein, particularly from the perspective of a router at which the tunnel fails. The procedure 700 may start at step 705, and continues to step 710, where, as described in greater detail above, a router (e.g., B) receives a signal 450 to establish a tunnel in a non-originating domain (e.g., AS2), where the signal has an ID of an originating PCE of an originating domain, such as the domain ID (e.g., AS1) or the PCE ID (e.g., ASBR1*). If in step 715 the router determines that establishment of the tunnel fails, then in step 720 the router signals the failure of the establishment to a local PCE of the non-originating domain (signal 460, e.g., to ASBR6*). The signaling indicates the ID of the originating PCE, and causes the local PCE to provide updated routing information of the non-originating domain to the originating PCE, such as described below with reference to FIG. 8. In addition, in step 725 the router may signal the failure of the establishment to a head-end node of the tunnel in the originating domain (e.g., A), as described below with reference to FIG. 9. The procedure 700 for the router failing the tunnel establishment may then end in step 730.

Figure 8:
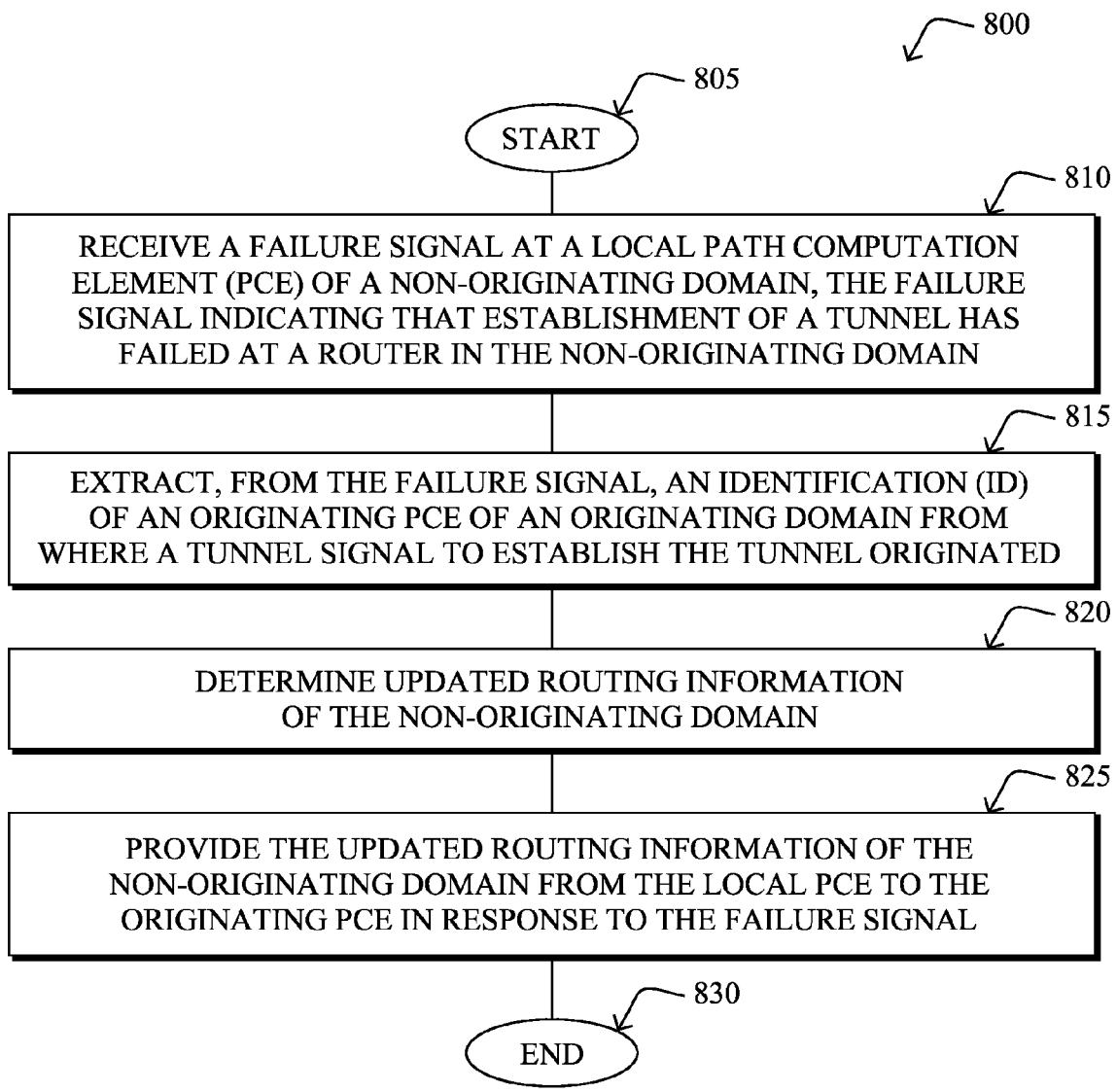
FIG. 8 illustrates an example simplified procedure for inter-domain signaling to update remote PCEs after a call set-up failure, particularly from the perspective of PCE of the domain in which the tunnel fails.

As noted, FIG. 8 illustrates an example simplified procedure 800 for inter-domain signaling to update remote PCEs after a call set-up failure in accordance with one or more embodiments described herein, particularly from the perspective of PCE of the domain in which the tunnel fails. The procedure 800 may start at step 805, and continues to step 810, where, as described in greater detail above, the local PCE (e.g., ASBR6*) receives a failure signal 460 that indicates that establishment of a tunnel has failed at a router in the non-originating domain. In step 815, the local PCE may then extract from the failure signal an ID of the originating PCE from where the tunnel signal to establish the tunnel originated. In response, in step 820, the local PCE may determine updated routing information of the non-originating domain (e.g., sending an explicit request or waiting until updated advertisements are received), and then in step 825 provides the updated routing information of the non-originating domain to the originating PCE in response to the failure signal. The procedure 800 for the local (non-originating) PCE may then end in step 830.

Figure 9:
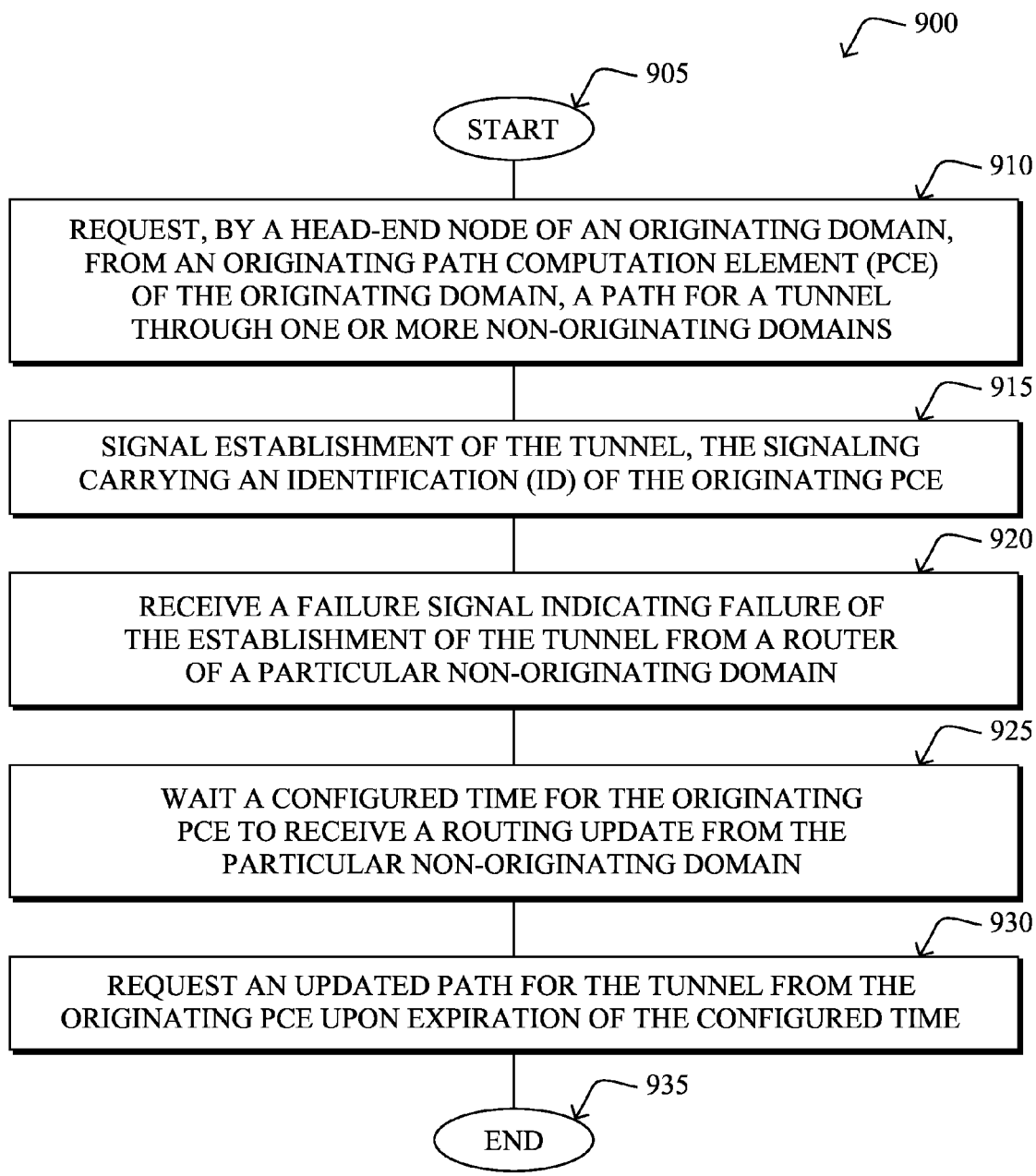
FIG. 9 illustrates an example simplified procedure for inter-domain signaling to update remote PCEs after a call set-up failure, particularly from the perspective of a head-end node of the failed tunnel.

As also noted, FIG. 9 illustrates an example simplified procedure 900 for inter-domain signaling to update remote PCEs after a call set-up failure in accordance with one or more embodiments described herein, particularly from the perspective of a head-end node of the failed tunnel. The procedure 900 may start at step 905, and continues to step 910, where, as described in greater detail above, the head-end node (e.g., A) requests, from an originating PCE (e.g. ASBR1*) of the originating domain, a path for a tunnel through one or more non-originating domains (e.g., to C in AS3). Subsequently, the head-end node may signal establishment of the tunnel in step 915, where the signal 450 carries an ID of the originating PCE, as mentioned above. Upon receiving a failure signal 690 in step 920 indicating failure of the establishment of the tunnel from a router of a particular non-originating domain, the head-end node may then wait a configured time in step 925 for the originating PCE to receive a routing update from the particular non-originating domain. Accordingly, in step 930, the head-end node may subsequently request an updated path for the tunnel from the originating PCE upon expiration of the configured time, and the procedure 900 ends in step 935.

It should be noted that while certain steps within procedures 700-900 may be optional as described above, the steps shown in FIGS. 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-900 are described separately, certain steps from each procedure may be incorporated into each other procedure, and the procedures are not meant to be mutually exclusive.

The techniques described herein, therefore, provide for inter-domain signaling to update remote PCEs after a call set-up failure. In particular, by providing a dynamic notification and updating feature to establish an accurate TED between stateful PCEs residing in a different AS in the event of a first call set-up failure, the techniques herein significantly improve the scalability and performance of inter-AS tunnels computed by stateful PCEs (e.g., by avoiding signaling churn). For instance, the techniques provide a reduced number of signaling messages and call set-up failures as compared to the conventional mode of operation.

While there have been shown and described illustrative embodiments that provide enhanced operation for stateful PCE architectures, it is to be understood that various other adaptations and modifications may be made within the spirit and scope of the embodiments herein. For example, the embodiments have been shown and described herein with relation to MPLS TE-LSPs and other various protocols. However, the embodiments in their broader sense are not as limited, and may, in fact, be used with any function for which a PCE may be responsible, such as other types of tunnels, other types of path computation, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving a signal to establish a tunnel at a router in a non-originating domain, the signal having an identification (ID) of an originating path computation element (PCE) of an originating domain from where the signal to establish the tunnel originated;
   determining that establishment of the tunnel fails at the router; and
   signaling the failure of the establishment from the router to a local PCE of the non-originating domain, the signaling indicating the ID of the originating PCE to cause the local PCE to provide updated routing information of the non-originating domain to the originating PCE.

2. The method as in claim 1, wherein the ID is an address of the originating PCE.

3. The method as in claim 1, wherein the ID is a domain ID of the originating domain.

4. The method as in claim 1, further comprising:
   signaling the failure of the establishment to a head-end node of the tunnel in the originating domain.

5. The method as in claim 4, wherein signaling the failure of the establishment to a head-end node of the tunnel causes the head-end node to wait a configured time before requesting an updated path for the tunnel from the originating PCE.

6. The method as in claim 1, wherein signaling the failure of the establishment from the router to the local PCE causes the local PCE to wait for a local routing update of the non-originating domain prior to providing updated routing information to the originating PCE.

7. An apparatus, comprising:
   one or more network interfaces to communicate within a computer network as a router in a non-originating domain;
   a processor coupled to the network interfaces and adapted to execute one or more processes; and
   a memory configured to store a process executable by the processor, the process when executed operable to:
      receive a signal to establish a tunnel, the signal having an identification (ID) of an originating path computation element (PCE) of an originating domain from where the signal to establish the tunnel originated;
      determine that establishment of the tunnel fails at the router; and
      signal the failure of the establishment to a local PCE of the non-originating domain, the signaling indicating the ID of the originating PCE to cause the local PCE to provide updated routing information of the non-originating domain to the originating PCE.

8. The apparatus as in claim 7, wherein the ID is at least one of either an address of the originating PCE or a domain ID of the originating domain.

9. The apparatus as in claim 7, wherein the process when executed is further operable to:
   signal the failure of the establishment to a head-end node of the tunnel in the originating domain.

10. The apparatus as in claim 9, wherein signaling the failure of the establishment to a head-end node of the tunnel causes the head-end node to wait a configured time before requesting an updated path for the tunnel from the originating PCE.

11. The apparatus as in claim 7, wherein signaling the failure of the establishment from the router to the local PCE causes the local PCE to wait for a local routing update of the non-originating domain prior to providing updated routing information to the originating PCE.

12. A method, comprising:
- receiving a failure signal at a local path computation element (PCE) of a non-originating domain, the failure signal indicating that establishment of a tunnel has failed at a router in the non-originating domain;
- extracting, from the failure signal, an identification (ID) of an originating PCE of an originating domain from where a tunnel signal to establish the tunnel originated;
- determining updated routing information of the non-originating domain; and
- providing the updated routing information of the non-originating domain from the local PCE to the originating PCE in response to the failure signal.

13. The method as in claim 12, wherein the ID is an address of the originating PCE.

14. The method as in claim 12, wherein the ID is a domain ID of the originating domain.

15. The method as in claim 12, further comprising:
- waiting for a local routing update of the non-originating domain prior to providing updated routing information to the originating PCE.

16. An apparatus, comprising:
- one or more network interfaces to communicate within a computer network as a local path computation element (PCE) in a non-originating domain;
- a processor coupled to the network interfaces and adapted to execute one or more processes; and
- a memory configured to store a process executable by the processor, the process when executed operable to:
  - receive a failure signal indicating that establishment of a tunnel has failed at a router in the non-originating domain;
  - extract, from the failure signal, an identification (ID) of an originating PCE of an originating domain from where a tunnel signal to establish the tunnel originated;
  - determine updated routing information of the non-originating domain; and
  - provide the updated routing information of the non-originating domain to the originating PCE in response to the failure signal.

17. The apparatus as in claim 16, wherein the ID is at least one of either an address of the originating PCE or a domain ID of the originating domain.

18. The apparatus as in claim 16, wherein the process when executed is further operable to:
- wait for a local routing update of the non-originating domain prior to providing updated routing information to the originating PCE.

19. A method, comprising:
- requesting, by a head-end node of an originating domain, from an originating path computation element (PCE) of the originating domain, a path for a tunnel through one or more non-originating domains;
- signaling establishment of the tunnel, the signaling carrying an identification (ID) of the originating PCE;
- receiving a failure signal indicating failure of the establishment of the tunnel from router of a particular non-originating domain;
- in response to the failure signal, waiting a configured time for the originating PCE to receive a routing update from the particular non-originating domain; and
- requesting an updated path for the tunnel from the originating PCE upon expiration of the configured time.

20. The method as in claim 19, wherein the ID is at least one of either an address of the originating PCE or a domain ID of the originating domain.

* * * * *